(12) United States Patent
Ryan

(10) Patent No.: US 6,963,949 B2
(45) Date of Patent: Nov. 8, 2005

(54) PIPELINED PACKET-ORIENTED MEMORY SYSTEM HAVING A UNIDIRECTIONAL COMMAND AND ADDRESS BUS AND A BIDIRECTIONAL DATA BUS

(75) Inventor: Kevin J. Ryan, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/434,082

(22) Filed: Nov. 5, 1999

(65) Prior Publication Data

US 2002/0161965 A1 Oct. 31, 2002

Related U.S. Application Data

(62) Division of application No. 08/886,753, filed on Jul. 1, 1997.

(51) Int. Cl.[7] .............................................. G06F 12/06
(52) U.S. Cl. ......................... 711/1; 711/105; 711/148; 365/230.03; 710/52
(58) Field of Search .......................... 711/1, 105, 158, 711/148, 167, 169, 154, 168; 365/189.04, 230.03, 230.05; 710/52, 126

(56) References Cited

U.S. PATENT DOCUMENTS

| | | |
|---|---|---|
| 3,902,163 A | 8/1975 | Amdahl et al. |
| 4,250,563 A | 2/1981 | Struger |
| 4,373,179 A | 2/1983 | Katsumata |
| 4,774,653 A | 9/1988 | James |
| 4,847,809 A | 7/1989 | Suzuki ................ 365/189.04 |
| 4,933,938 A | 6/1990 | Sheehy |
| 5,208,779 A | 5/1993 | Walther et al. ............ 365/222 |
| 5,229,969 A | 7/1993 | Lee et al. ................. 365/222 |
| 5,229,970 A | 7/1993 | Lee et al. ................. 365/222 |
| 5,270,964 A | 12/1993 | Bechtolsheim et al. ....... 365/52 |
| 5,282,177 A | 1/1994 | McLaury .............. 365/230.05 |

(Continued)

OTHER PUBLICATIONS

"SL–DRAM Protocol and Command Format", Slide Presentation, MOSAID Technologies, Inc., Joint Electron Device Engineering Council, Maui, 10 p., (Dec. 11, 1996).
"400 Mb/s/pin SLDRAM, 4M x 18 SLDRAM, Pipelined, Eight Bank, 2.5V Operation", SLDRAM Inc., Draft/Advance, SLD4M18DR400, 4 MEG x 18 SLDRAM, (1998), pp. 1–69.
"Draft Standard for A High–Speed Memory Interface (SyncLink)", The Institute of Electrical and Electronics Engineers, Inc, Draft 0.99 IEEE P1596.7–199X,(1996),pp. 1–55.
"New NEC Memory Technology Increases Performance by 20%", http://www.nb–pacifica.com/headline/newnecmemorytechnolo$_{13}$ 1144.sh, (1997), pp. 1–2.
"Virtual Channel Memory", NEC Electronics Inc., (1997), pp. 1–2.
Gillingham, P., "SLDRAM Architectural and Functional Overview", The SLDRAM Consortium, (Aug. 1997), pp. 1–14.

Primary Examiner—B. James Peikari
(74) Attorney, Agent, or Firm—Schwegman, Lundberg, Woessner & Kluth, P.A.

(57) ABSTRACT

A memory system having at least one memory subsystem and using a packet protocol communicated over a command and address bus and at least one data bus. The memory subsystems are pipelined to achieve wide data paths and to support a high number of memory devices, such as dynamic random access memory devices, per data bus. The packet protocol is defined to compensate for the delay stages of the pipelined memory subsystem in order to optimize the access time of the memory devices.

47 Claims, 6 Drawing Sheets

U.S. PATENT DOCUMENTS

| | | |
|---|---|---|
| 5,327,394 A | 7/1994 | Green et al. .............. 365/233.5 |
| 5,335,201 A | 8/1994 | Walther et al. ............. 365/222 |
| 5,450,355 A | 9/1995 | Hush ..................... 365/189.04 |
| 5,513,327 A | 4/1996 | Farmwald et al. .......... 710/129 |
| 5,517,253 A | 5/1996 | De Lange .................. 348/513 |
| 5,524,098 A | 6/1996 | Holland et al. ............. 365/219 |
| 5,528,176 A | 6/1996 | Kean |
| 5,578,940 A | 11/1996 | Dillon et al. ................. 326/30 |
| 5,587,964 A * | 12/1996 | Rosich et al. ............... 365/221 |
| 5,598,545 A | 1/1997 | Childers et al. |
| 5,615,355 A | 3/1997 | Wagner |
| 5,617,367 A | 4/1997 | Holland et al. ............. 365/219 |
| 5,617,575 A | 4/1997 | Sakakibara et al. ........... 712/34 |
| 5,625,593 A | 4/1997 | Kimura |
| 5,625,780 A | 4/1997 | Hsieh et al. |
| 5,638,534 A | 6/1997 | Mote, Jr. |
| 5,666,494 A | 9/1997 | Mote, Jr. .................... 711/167 |
| 5,680,365 A | 10/1997 | Blankenship .......... 365/230.05 |
| 5,721,862 A | 2/1998 | Sartore et al. |
| 5,726,947 A | 3/1998 | Yamazaki et al. ...... 365/230.03 |
| 5,875,452 A | 2/1999 | Katayama et al. .......... 711/105 |
| 5,889,970 A | 3/1999 | Horan et al. |
| 5,903,509 A | 5/1999 | Ryan et al. |
| 5,911,051 A | 6/1999 | Carson et al. |
| 5,996,059 A | 11/1999 | Porten et al. ............... 712/200 |
| 6,055,615 A | 4/2000 | Okajima ..................... 711/169 |
| 6,138,230 A | 10/2000 | Hervin et al. ............... 712/216 |
| 6,172,893 B1 | 1/2001 | Ryan |
| 6,184,906 B1 | 2/2001 | Wang et al. ................. 345/521 |

* cited by examiner

PIPELINED PACKET-ORIENTED MEMORY SYSTEM HAVING A UNIDIRECTIONAL COMMAND AND ADDRESS BUS AND A BIDIRECTIONAL DATA BUS

This application is a Divisional of U.S. application Ser. No. 08/886,753, filed Jul. 1, 1997.

FIELD OF THE INVENTION

This invention relates generally to the field of memory devices, and more particularly to a pipelined packet-oriented synchronous DRAM interface.

BACKGROUND OF THE PRIOR ART

Conventional memory devices have a standard interface consisting of separate address, data and control pins. For example, one version of a synchronous dynamic random access memory (SDRAM) has twelve address pins, two multiplexed address and control pins, seven control pins and sixteen data pins. This approach offers a great deal of flexibility since computer systems vary greatly in their memory requirements. In particular, the bandwidth of memory systems using SDRAMs can easily be increased by adding another SDRAM in parallel to the existing SDRAMs, thereby increasing the width of the memory bus.

The tradeoff for this flexibility is, however, an increase in layout space which leads to an increase in manufacturing cost. Separate traces need to be run for each pin of each SDRAM. Therefore, it is sometimes cost prohibitive to use SDRAMS for wide memory systems.

One approach to lower the cost of expanding memory is to use memory devices which multiplex address, control and data information on the same pins. For example, some memory devices have a set of generic interface pins which connect to a high-speed, synchronous bus. Communication over the bus is accomplished by a series of packets which conform to a predefined packet protocol. Usually the packet protocol is fairly sophisticated and has a complete command set. For example, DRAMS conforming to the RAMBUS™ interface communicate using a protocol in which each packet consists of six bytes transmitted sequentially over a high-speed bus known as a "Channel." In this manner, the packets encapsulate all address, control and data information.

Because of the efficient use of generic interface pins, a packet protocol reduces the required number of pins to approximately 30. However, this has the disadvantage of decreasing effective data bandwidth, because only a portion of the total bus bandwidth is available for data (the rest of the bandwidth is reserved for address and control information).

Another method for reducing the cost associated with increasing total memory bandwidth, without decreasing effective data bandwidth, is to provide a second high-speed bus specifically for communicating data. In this approach, address and control information is communicated over a unidirectional high-speed address/control bus while data is communicated over a bidirectional high-speed data bus. Both communications conform to a predefined packet protocol. This approach has the benefits of reducing the total pin count (although not as much as the RAMBUS™ protocol described above), yet has the added benefit that only the data bus needs to be duplicated when the width of the memory system is increased.

Both approaches described above offer advantages over traditional memory architectures in terms of increased data retrieval bandwidth. It is difficult, however, to implement systems having both fine granularity and large memory depth using such devices. What is needed is a memory architecture which supports increased bandwidth, fine granularity, and large memory arrays.

SUMMARY OF THE INVENTION

As explained in detail below, an improved memory system is provided having a unidirectional command and address bus coupled to a memory controller, the memory controller communicating commands and addresses to the command and address bus. A bidirectional data bus is also coupled to the memory controller, the memory controller communicating data information to the bidirectional data bus for a write operation and receiving the data information from the bidirectional data bus during a read operation. The memory system further includes a plurality of memory devices, a buffer register connected between the command and address bus and the plurality of memory devices, the buffer register receiving and latching the commands and addresses from the command and address bus and driving the commands and addresses to the plurality of memory devices, and a data register connected between the plurality of memory devices and the bidirectional data bus, the data register receiving and latching the data information from the bidirectional data bus and driving the data information to the plurality of memory devices for a write operation, the data register receiving and latching the data information from the plurality of memory devices and driving the data information to the bidirectional data bus for a read operation.

In another embodiment of the invention, the memory system has a unidirectional command and address bus coupled to a memory controller, the memory controller communicating commands and addresses to the command and address bus, and a bidirectional data bus coupled to the memory controller, the memory controller communicating data information to the bidirectional data bus for a write operation and receiving the data information from the bidirectional data bus during a read operation. The memory system further includes a plurality of pipelined memory subsystems, each memory subsystem having a plurality of memory devices, a buffer register connected between the command and address bus and the plurality of memory devices, the buffer register receiving and latching the commands and addresses from the command and address bus and driving the commands and addresses to the plurality of memory devices, and a data register connected between the plurality of memory devices and the bidirectional data bus, the data register receiving and latching the data information from the bidirectional data bus and driving the data information to the plurality of memory devices for a write operation the data register receiving and latching the data information from the plurality of memory devices and driving the data information to the bidirectional data bus for a read operation.

According to another feature of the invention, the memory system includes a unidirectional command and address bus coupled to a memory controller, the memory controller communicating commands and addresses to the command and address bus, and a bidirectional data bus coupled to the memory controller, the memory controller communicating data information to the bidirectional data bus for a write operation and receiving the data information from the bidirectional data bus during a read operation. The memory system further includes a memory module including a pipelined memory subsystem. The pipelined memory subsystem includes: a) a plurality of memory devices, b) a buffer register connected between the command and address bus and the plurality of memory devices, the buffer register receiving and latching the commands and addresses from the command and address bus and driving the commands and addresses to the plurality of memory devices, and c) a data register connected between the plurality of memory devices and the bidirectional data bus, the data register receiving and latching the data information from the bidirectional data bus and driving the data information to the plurality of memory devices for a write operation, the data register receiving and latching the data information from the plurality of memory devices and driving the data information to the bidirectional data bus for a read operation. The memory system also has a socket adapted to receive the memory module and to couple the pipelined memory subsystem of the memory module to the unidirectional command and address bus and to the bidirectional data bus.

In order to solve the problems in the prior art, we have provided a method for storing data in a pipelined memory system. The method includes the steps of communicating commands and addresses to a unidirectional command and address bus, communicating data information to a bidirectional data bus, latching the commands and addresses in a plurality of buffer registers, latching the data in a plurality of data registers, driving the latched commands and addresses to a plurality of memory devices having addressable storage, driving the latched data to the plurality of memory devices, and storing the data in the addressable storage of one of the plurality of memory devices.

These and other features and advantages of the invention will become apparent from the following description of the preferred embodiments of the invention.

DESCRIPTION OF THE PRESENT INVENTION

Figure 1:
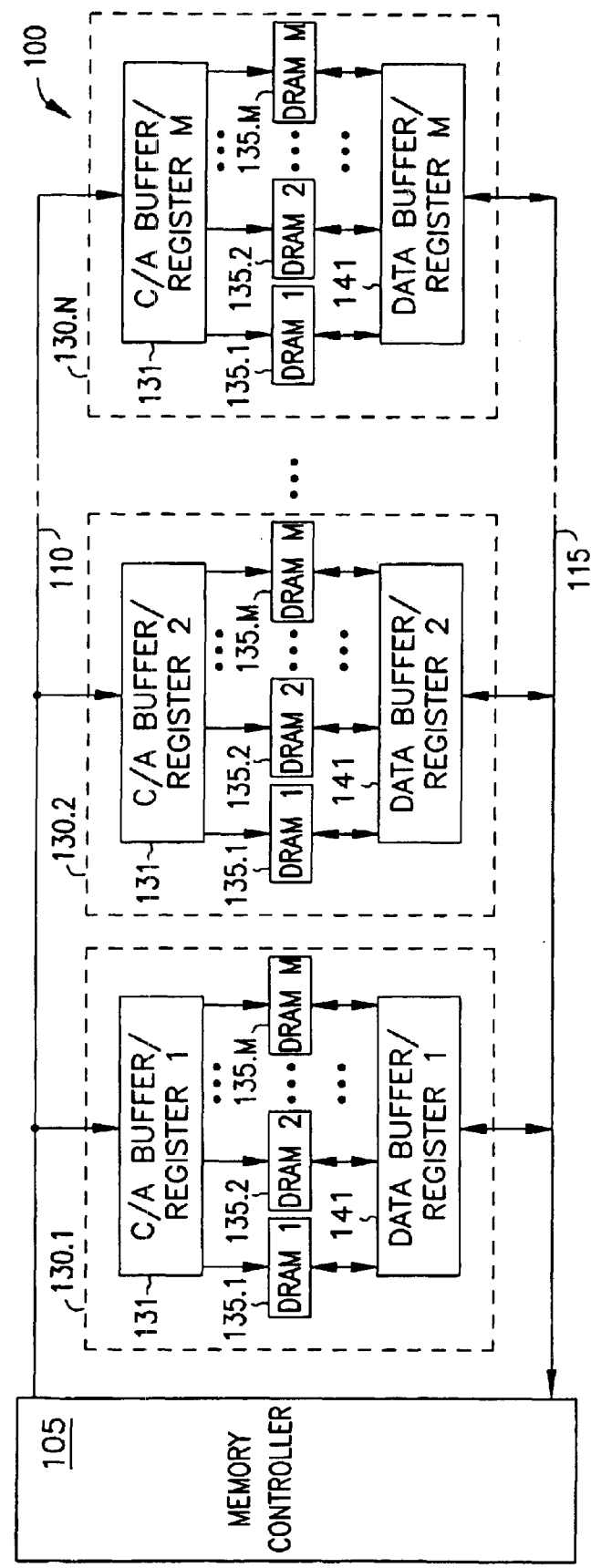
FIG. 1 is a block diagram of one embodiment of a packet-oriented memory system having a command/address bus, a data bus and a plurality of pipelined memory subsystems.

In the following detailed description, references are made to the accompanying drawings which illustrate specific embodiments in which the invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In a memory system having a single high-speed command and address bus (C/A bus) and a high-speed data bus, the C/A bus will experience the same electrical loading as the high-speed data bus. Assuming similar physical layouts for each bus, a maximum frequency of operation is similar for each bus and is primarily determined by the number of devices on the bus.

In order to increase the bandwidth of a memory system having two high-speed busses, a new memory device is added in parallel to the existing devices and a corresponding data bus is added. For example, assume that a memory system has a single memory device, a single C/A bus and a single data bus. In order to increase the bandwidth of the memory system a second memory device maybe added in parallel to the first. In this manner, the memory system uses a single C/A bus and two data busses. Since each memory device has its own data bus, the effective bandwidth of the system is doubled.

At the same time, however, loading on the single C/A bus also doubles. In fact, as the bandwidth of a memory system is increased, the loading on the C/A bus increases at a rate directly proportional to that increase. As the number of devices on a bus increases, the frequency at which the bus can be reliably operated therefore decreases. Thus, in increased bandwidth implementations, the maximum frequency of operation for the C/A bus will be lower than that for the data bus. Since both busses are typically run at the same frequency, the bandwidth of the memory system is limited by the number of devices on the C/A bus. Similarly, at a given operating frequency, there is a maximum number of devices that can be supported on the C/A bus, and hence in the memory system.

Conventional microprocessor based systems utilize three busses: a memory data bus, a command bus and an address bus. For example, one popular Intel microprocessor based system provides a 66 MHz memory data bus, a 66 MHz command bus and a 66 MHz address bus. Each of the command and address busses is capable of driving up to 64 loads. The data bus can only drive eight loads. At a clock speed of 66 MHz and a data width of 64 bits, such a system has a bandwidth of approximately 0.5 GBytes/second. It is desirable, however, to substantially increase this bandwidth to the order of 1.6 GBytes/s. If a single 16-bit data bus is used, it must be operated at approximately 800 MHz in order to achieve the desired data rate. It is also desirable to continue to support 64 devices; however, simulations demonstrate that, with improvements to the signaling and physical environment, the number of loads that can be supported at a data rate of 800 MHz is approximately eight. In order to support 64 devices in a system with eight devices per 16-bit data bus, eight data busses would be required. This results in a 128-bit wide data path. Such a wide data path is inconsistent with the desire to reduce the total number of traces and is cost prohibitive.

The present invention is a system which uses a unidirectional C/A bus and a data bus yet supports a plurality of devices per bus such that the total width of the data path width is not cost prohibitive to manufacture. For example, the present invention provides a memory system which utilizes a single 16-bit data bus which can be operated at 800 MHz and which supports 64 devices. Such a system can also be implemented as a higher bandwidth multiple data bus system as is described below.

FIG. 1 is a block diagram of one embodiment of a packet-oriented memory system according to the present invention. Referring to FIG. 1, memory system 100 includes a memory controller 105, a command/address bus (CIA) bus 110, a data bus 115 and a plurality of pipelined memory subsystems 130.1 through 130.N, where N is the number of subsystems in memory system 100. Memory controller 105 communicates commands and addresses to CIA bus 110. Furthermore, memory controller 105 is coupled to data bus 115 for reading and writing data from memory subsystems 130 thereon. In one embodiment, C/A bus 110 is a unidirectional high-speed bus while data bus 115 is a bidirectional high-speed bus. Memory controller 105 communicates data information to data bus 110 during a write cycle and receives data information from data bus 115 during a read cycle. Memory controller 105 communicates over C/A bus 110 and data bus 115 via a predetermined packet protocol.

Each memory subsystem 130 includes a C/A buffer register 131, a plurality M of memory devices 135 and a data buffer register 141. C/A buffer register 131 receives and latches the command and address information from C/A bus 110. As illustrated in FIG. 1, buffer register 131 is connected between the command and address bus 110 and the plurality of memory devices 135.1 through 135.M. In one embodiment, memory system 100 has eight memory subsystems each with eight memory devices 135 (i.e. N times M equals sixty-four). In another embodiment, memory devices 135 are dynamic random access memory devices (DRAMs). The number of memory devices 135 connected to each buffer register 131 may, however, differ from that shown in memory system 100 without departing from the spirit of the present invention.

As illustrated, memory system 100 comprises N C/A registers 131 and N*M DRAMs. Each register drives the latched command and address information to its corresponding plurality of memory devices. In this manner, the load on the C/A bus is reduced from N*M devices to only N devices.

Each data register 141 is connected between the plurality of memory devices 135 and data bus 115. For memory read operations, data registers 141 receive and latch data information from memory devices 135. Upon the next clock cycle, data registers 141 provide the information to memory controller 105 by driving the data information on data bus 115. For memory write operations, each data register 141 receives and latches data information from data bus 115. Upon the next clock cycle, data registers 141 drive the data information to their corresponding M memory devices 135. In this manner, the load on data bus 115 is reduced from N*M devices to only N devices.

Each C/A buffer register 131, its corresponding plurality of memory devices 135.1 through 135.M and its corresponding data register 141 define a pipelined memory subsystem 130. Memory subsystems 130.1 through 130.N allow C/A bus 110 and data bus 115 to operate at a significant higher data rate since the loading was reduced by a factor of M. Pipelined memory subsystems 130, however, add a two clock cycle delay to DRAM access. In order to ensure efficient operation, the packet protocol used for communication is defined to incorporate a first delay for C/A buffer register 131 and a second delay for data register 141. Furthermore, memory controller 105 issues command and address packets and data packets in pipeline fashion such that the first delay and the second delay do not have a substantial impact on the performance of memory system 100.

Figure 2:
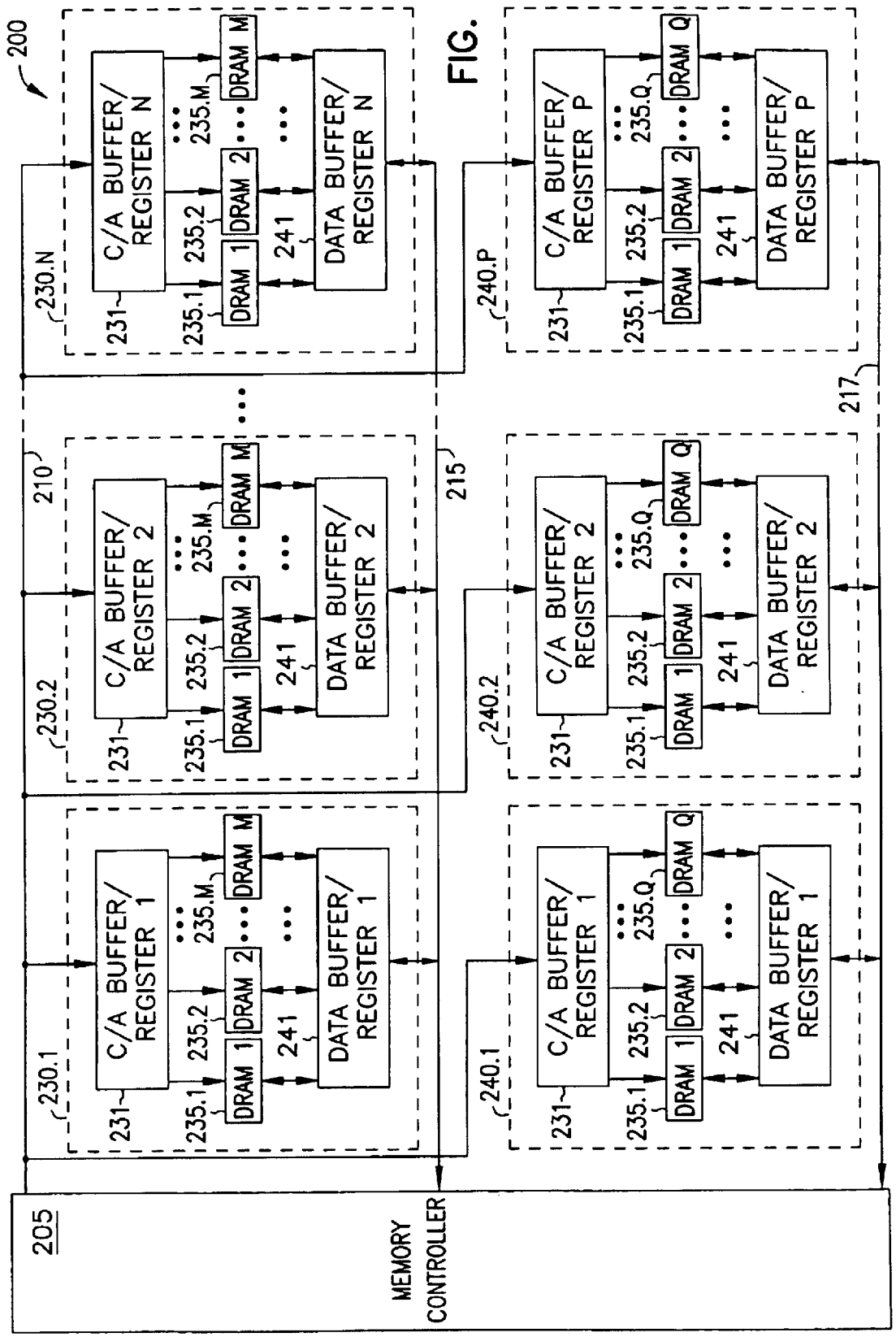
FIG. 2 is a block diagram of an alternate embodiment of a packet-oriented memory system having a single C/A bus, two data busses and a first and second plurality of pipelined memory subsystems.

FIG. 2 is a block diagram of an alternate embodiment of a packet-oriented memory system having pipelined memory subsystems. Referring to FIG. 2, memory system 200 includes a memory controller 205, a command/address bus (C/A) bus 210, a first data bus 215, a second data bus 217, a first plurality of pipelined memory subsystems 230.1 through 230.N and a second plurality of pipelined memory subsystems 240.1 through 240.P. In this configuration, N and P are the number of pipelined memory subsystems in the first and second plurality of pipelined memory subsystems, respectively.

Memory controller 205 communicates commands and addresses to CIA bus 210. Memory controller 205 is coupled to a first data bus 215 and a second data bus 217. C/A bus 210 is a unidirectional high-speed bus while data busses 215 and 217 are bidirectional high-speed busses. Memory controller 205 communicates data information to data busses 215 and 217 during a memory write cycle and receives data information from data busses 215 and 217 during a read cycle. Memory controller 205 communicates over CIA bus 210 and data busses 215 and 217 via a predetermined packet protocol.

Each of the first plurality of pipelined memory subsystems 230.1 through 230.N includes a CIA buffer register 231, a plurality M of memory devices 235 and a data buffer register 241. Similarly, each of the second plurality of pipelined memory subsystems 240.1 through 240.P includes a C/A buffer register 231, a plurality M of memory devices 235 and a data buffer register 241.

C/A buffer register 231 receives and latches the command and address information from C/A bus 210. In the first plurality N of pipelined memory subsystems, register 231 is connected between the command and address bus 210 and a plurality of memory devices 235.1 through 235.M. In the second plurality P of pipelined memory subsystems, register 231 is connected between the command and address bus 210 and a plurality of memory devices 235.1 through 235.Q. In one embodiment, the number of memory subsystems N and the number of memory subsystems P is four and eight dynamic random access memory devices (DRAMs) 235 are connected to each register 231 (i.e. N=4, P=4, M=8 and Q=8).

Data registers 241 of memory subsystems 230 are connected between the plurality M of memory devices 235 and the first bidirectional data bus 215. Similarly, data registers 241 of memory subsystems 240 are connected between the plurality Q of memory devices 235 and the second bidirectional data bus 217. For memory read operations, data registers 241 receive and latch data information from the corresponding plurality of DRAMs 235. Upon the next clock cycle, data registers 241 drive the data information to corresponding data busses 215 and 217. For memory write operations, data registers 241 receive and latch data information from corresponding data busses 215 and 217 and drive the data information to the plurality of memory devices 235.

As illustrated in FIG. 2, memory system 200 has N+P C/A buffer registers 231 and (N*M)+(P*Q) memory devices 235. In this manner, the load on the C/A bus is reduces from (N*M)+(P*Q) devices to N+P devices. Similarly, the load on data busses 215 and 217 is reduced from N*M and P*Q devices to N and P devices, respectively. The maximum data bandwidth of memory system 200 is thereby directly increased. As described earlier, pipelined memory subsystems 230 and 240 adds a two clock cycle delay to DRAM access. Memory controller 205 issues command and address packets and data packets in a pipelined fashion in order to optimize communication throughput such that the first delay and the second delay do not have a substantial impact on the performance of memory system 200.

Figure 3:
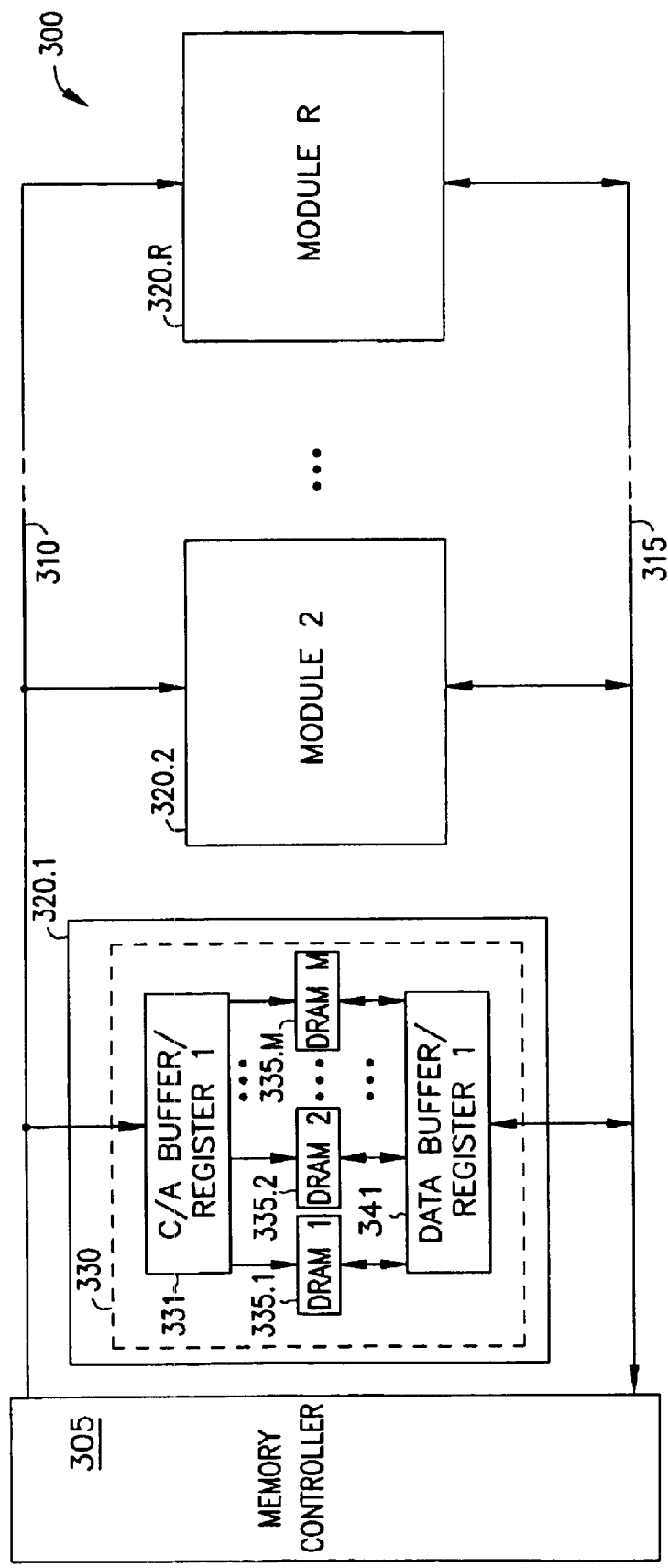
FIG. 3 is a block diagram of one embodiment of a memory system having a plurality of memory modules where each memory module has a single pipelined memory subsystem.

FIG. 3 is a block diagram of one embodiment of a memory system having a plurality of memory modules, each memory module having a single pipelined memory subsystem. Referring to FIG. 3, memory system 300 includes memory controller 305, a C/A bus 310, a data bus 315, a plurality R of memory modules 320 and a plurality of sockets (not shown). Memory controller 305 communicates commands and addresses to C/A bus 310. Furthermore, memory controller 305 is coupled to data bus 315. C/A bus 310 is a unidirectional high-speed bus while data bus 315 is a bidirectional high-speed bus. Memory controller 305 communicates data information to data bus 315 during a write cycle and receives data information from data bus 315 during a read cycle. Memory controller 305 communicates over C/A bus 310 and data bus 315 via a predetermined packet protocol.

Each memory module 320 represents any physical device which encapsulates at least one memory subsystem. In one embodiment, a memory module may be a single in-line memory module (SIMM). In order to provide for flexible configuration, memory system 300 has a plurality of sockets (not shown) which are adapted to receive memory modules. The plurality of sockets are disposed between each memory module 320 and C/A bus 310 and data bus 315 such that a socket receives a memory module 320 and couples memory module 320 to C/A bus 310 and data bus 315. Thus, the sockets allow memory modules 320 to easily be added to or removed from memory system 300.

Each memory module 320 has at least one pipelined memory subsystem. For purposes of illustration, memory module 320.1 is shown with a single pipelined memory subsystem 330. Memory subsystem 330 comprises C/A buffer register 331, a plurality M of memory devices 335 and a data buffer 341. C/A buffer register 331 is coupled between C/A bus 310 and the plurality M of memory devices 335.1 through 335.M. C/A buffer register 331 receives and latches the command and address information from C/A bus 310. Data register 341 is connected between data bus 315 and the plurality M of memory modules 335. For memory read operations, data register 341 receives and latches data information from the plurality of memory devices 335 and drives the data information to data bus 320. For memory write operations, data register 341 receives and latches data information from data bus 320 and drives the data information to the plurality of memory devices. In this manner, the load on C/A bus 310 and data bus 320 is reduced from R*M devices to R devices, thereby allowing C/A bus 310 and data bus 320 to achieve higher operating speeds.

Figure 4:
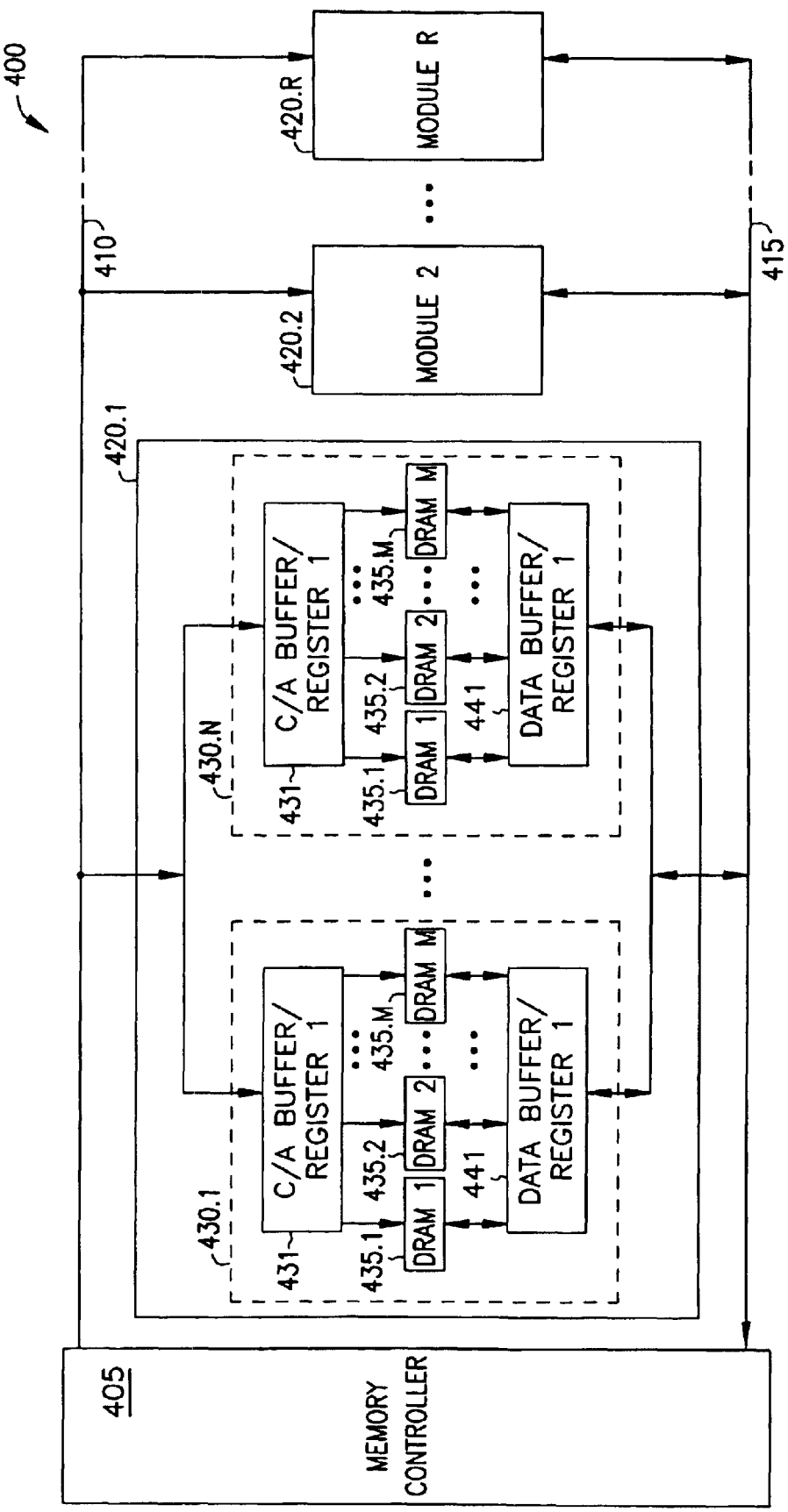
FIG. 4 is a block diagram of an alternate embodiment of a memory system having a plurality of memory modules where each memory module includes a plurality of pipelined memory subsystems.

FIG. 4 is a block diagram of an alternate embodiment of a memory system having a plurality of memory modules, each memory module having a plurality of pipelined memory subsystems. More specifically, memory system 400 includes memory controller 405, a CIA bus 410, a data bus 415, a plurality R of memory modules 420 and a plurality of sockets (not shown). Memory controller 405 communicates commands and addresses to C/A bus 410. Furthermore, memory controller 405 is coupled to data bus 415 for reading and writing data from memory subsystems 430. In one embodiment, C/A bus 410 is a unidirectional high-speed bus while data bus 415 is a bidirectional high-speed bus. Memory controller 405 communicates data information to data bus 415 during a memory write cycle and receives data information from data bus 415 during a read cycle. Memory controller 405 communicates over C/A bus 410 and data bus 415 via a predetermined packet protocol.

Each memory module 420 of memory system 400 includes a plurality N of pipelined memory subsystems 430.1 through 430.N. Furthermore, each memory subsystem 430 include a CIA buffer register 431, a plurality M of memory devices 435.1 through 435.M, and a data buffer 441. C/A buffer register 431 is coupled between C/A bus 410 and the plurality of memory devices 435. C/A buffer register 431 receives and latches the command and address information from C/A bus 410. Data register 441 is connected between data bus 415 and the plurality of memory modules 435. For memory read operations, data register 441 receives and latches data information from the plurality of memory devices 435 and drives the data information to data bus 415. For memory write operations, data register 441 receives and latches data information from data bus 415 and drives the data information to the plurality of memory devices 435. In this manner, the load on data bus 415 is reduced by a factor of M.

Figure 5:
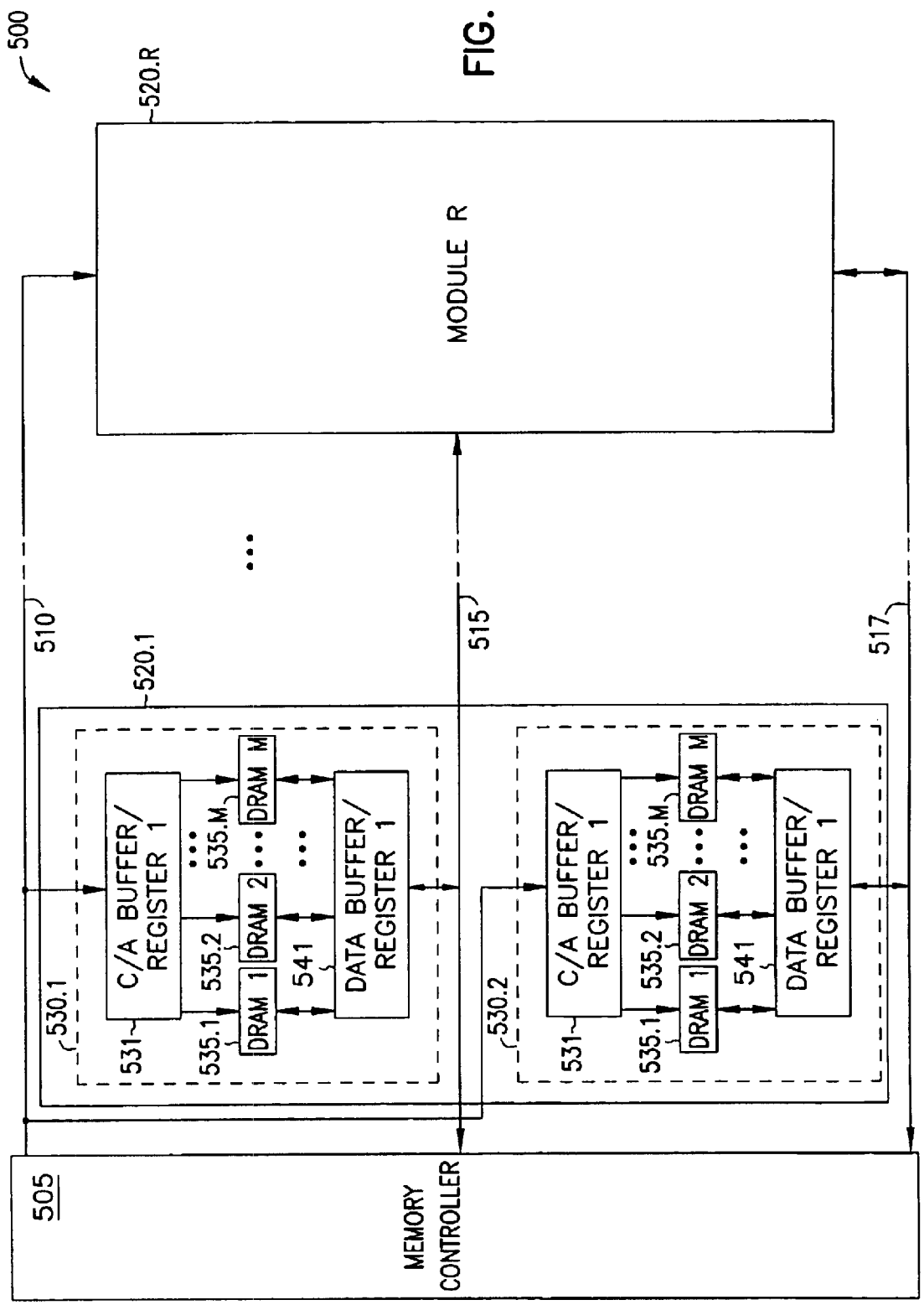
FIG. 5 is a block diagram of an alternate embodiment of a memory system having a plurality of memory modules coupled to a first and second data bus, each memory module having two memory subsystems.
Figure 6:
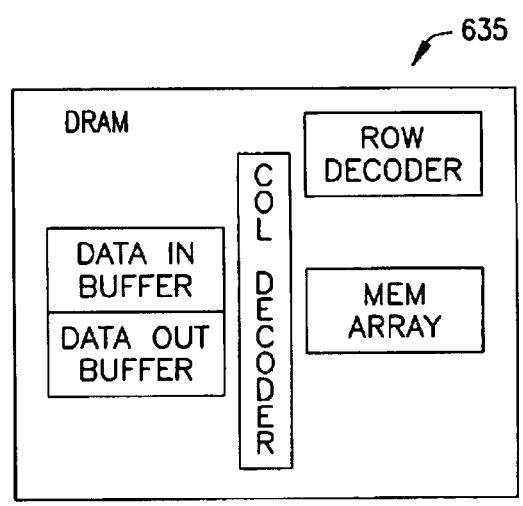
FIG. 6 is a block diagram of a dynamic random access memory device.

FIG. 5 is a block diagram of an alternate embodiment of a memory system having a plurality of memory modules coupled to two data busses, each memory module having two memory subsystems. Memory system 500 is similar to memory system 400 illustrated in FIG. 4 except that memory system 500 implements a wider data path.

Memory system 500 includes memory controller 505, C/A bus 510, a first data bus 515, a second data bus 517, a plurality of sockets (not shown) and a plurality R of memory modules 520. Each memory module 520.1 through 520.R includes a first and second memory subsystem 530.1 and 530.2. Memory subsystems 530 include a C/A buffer register 531, a plurality M of memory devices 535 and a data register 541. In one embodiment, memory system 500 has four sockets (not shown), four memory modules 520, each memory module 520 having two memory subsystems 530 of eight memory devices 535 (i.e., R=4 and M=8). In another embodiment, the memory devices 535 are SDRAMs.

Memory controller 505 communicates commands and addresses to C/A bus 510. Memory controller 505 is coupled to data busses 515 and 517. In one embodiment, C/A bus 510 is a unidirectional high-speed bus while data busses 515 and 517 are bidirectional high-speed busses. Memory controller 505 communicates data information to data busses 515 and 517 during a memory write cycle and receives data information from data busses 515 and 517 during a read cycle. Memory controller 505 communicates over C/A bus 510 and data busses 515 and 517 via a predetermined packet protocol.

Buffer register 531 of pipelined memory subsystems 530 receive and latch the command and address information from C/A bus 410. Data register 541 of memory subsystem 530.1 is connected between data bus 515 and the plurality of memory devices 535. Data register 542 of memory subsystem 530.1, however, is connected between data bus 517 and its corresponding plurality of memory modules 535. In this manner, memory system 500 has a wider data path than memory system 400 of FIG. 4.

For memory read operations, data register 541 of memory subsystem 530.1 receives and latches a first data information from its corresponding plurality of memory devices 535 and drives the first data information to data bus 515. Similarly, during a read operation, data register 541 of memory subsystem 530.2 receives and latches a second data information from its corresponding plurality of memory devices 535 and drives the second data information to data bus 517. For memory write operations, data register 541 of memory subsystem 530.1 receives and latches the first data information from data bus 515 and drives the first data information to its corresponding plurality of memory devices 535.

Similarly, data register 541 of memory subsystem 530.2 receives and latches the second data information from data bus 520 and drives the second data information to its corresponding plurality of memory devices 535. In this manner, the loads C/A bus 510 and on both data busses 515 and 517 are reduced from M*R devices to R devices.

CONCLUSION

Various embodiments of a pipelined, packet-oriented memory systems have been described. Such a system offers the flexibility of multiple busses having a plurality of memory devices yet allows the busses to operate at a high data rate. In one embodiment, the memory system comprises a plurality of memory subsystems coupled to a high-speed command and address bus and a high-speed data bus, each memory subsystem having eight memory devices. In another embodiment, a first plurality of pipelined memory subsystems uses a first data bus while a second plurality of pipelined memory subsystems uses a second data bus. In another embodiment, the memory system has a plurality of sockets adapted to receive a memory module, wherein a memory module contains at least one memory subsystem. In another embodiment, the memory system has a first plurality of sockets connected to a first data bus and a second plurality of sockets connected to a second data bus, the memory modules comprising two memory subsystems. This application is intended to cover any adaptations or variations of the present invention. It is manifestly intended that this invention be limited only by the claims and equivalents thereof.

What is claimed is:

1. A memory system comprising:
   a memory controller;
   a separate unidirectional command and address bus coupled to the memory controller, the memory controller communicating commands and addresses to the command and address bus;
   a separate bidirectional data bus coupled to the memory controller, the memory controller communicating data information to the bidirectional data bus for a write operation and receiving the data information from the bidirectional data bus during a read operation; and
   a plurality N of pipelined memory subsystems, wherein each memory subsystem includes:
      a plurality M of memory devices wherein each memory device internally contains a data in and a data out buffer, a column decoder and a row decoder;
      a command buffer directly connected between the separate unidirectional command and address bus and the plurality of memory devices, the command buffer receiving and latching the commands and addresses from the separate unidirectional command and address bus and driving the commands and addresses to the plurality of memory devices, wherein the command buffer is shared by the plurality of M memory devices in the memory subsystem; and
      a data buffer directly connected between the plurality of M memory devices and the separate bidirectional data bus, the data buffer receiving and latching the data information from the separate bidirectional data bus and driving the data information to the plurality of M memory devices for a write operation, the data buffer receiving and latching the data information from the plurality of M memory devices and driving the data information to the separate bidirectional data bus for a read operation, wherein the data buffer is shared by the plurality of M memory devices in the memory subsystem.

2. The memory system according to claim 1, wherein the memory controller communicates the commands and addresses and the data information using a pipelined packet-protocol which incorporates a first delay introduced by the command buffer of one of the plurality of pipelined memory subsystems and a second delay introduced by the data buffer of one of the plurality of pipelined memory subsystems.

3. The memory system according to claim 1 wherein each memory device is a dynamic random access memory device.

4. The memory system according to claim 1 wherein each of the plurality N of pipelined memory subsystems includes eight memory devices and wherein N equals eight.

5. The memory system of claim 1, wherein N equals eight.

6. The memory system of claim 1, wherein M equals eight.

7. The memory system of claim 1, wherein each of the memory devices includes an addressable storage.

8. The system according to claim 1, wherein the bidirectional data bus is a single 16 bit bus, supports 64 data buffers, and operates at 800 MHz.

9. A method of operating the memory system of claim 1, comprising:
   issuing commands and addresses on the unidirectional command and address bus;
   latching the commands and addresses in the command buffers;
   driving the latched commands and addresses to the column and row decoders; retrieving data from addressable storage of one of the plurality of memory devices; latching the data in the data in and data out buffers;
   latching the data from the data in and data out buffer in the data buffers; and
   receiving the data on the bidirectional data bus.

10. A method of retrieving data in a pipelined memory system, having a plurality of memory subsystems, wherein each memory subsystem includes a command buffer, a data buffer and a plurality of memory devices, wherein each memory device includes addressable storage, a data in and a data out buffer, a column decoder and a row decoder, comprising:
   issuing commands and addresses on a separate unidirectional command and address bus;
   latching the commands and addresses in the command buffers of each memory subsystem, wherein each of the command buffers is shared by M of the plurality of memory device of each memory subsystem and is positioned between and is directly connected to, the command and address bus and the plurality of M memory devices of each memory subsystem;
   driving the latched commands and addresses to the column and row decoders;
   retrieving data from the addressable storage of one of the plurality of memory devices;
   latching the data in the data in and data out buffer of the one of the plurality of memory devices;
   latching the data in the data buffer of the one memory subsystem; and receiving the data on a bidirectional data bus.

11. The method of retrieving data according to claim 10 wherein each of the memory devices is a dynamic random access memory device.

12. The method of retrieving data in a pipelined memory system according to claim 10 wherein issuing commands and addresses and receiving data communicates according to a packet protocol which incorporates a first delay introduced by the command buffer and a second delay introduced by the data buffer.

13. A method of storing data in a pipelined memory system, having a plurality of memory subsystems, wherein each memory subsystem includes a command buffer, a data buffer and a plurality of memory devices, wherein each memory device includes addressable storage, a data in and a data out buffer, a column decoder and a row decoder, comprising:

issuing commands and addresses on a separate unidirectional command and address bus;

issuing data on a bidirectional data bus;

latching the commands and addresses in the plurality of command buffers, wherein each of the plurality of command buffers is shared by M of the plurality of memory devices and is positioned between, and directly connected to, the separate unidirectional command and address bus and the plurality of memory devices;

latching the data in the plurality of data buffers of the memory subsystem;

driving the latched commands and addresses to the column and row decoders;

driving the latched data to the data in buffers of the memory device; and storing the data in the addressable storage of the plurality of memory devices.

14. The method of claim 13, wherein issuing commands and addresses and issuing data include executing a packet protocol which incorporates a first delay introduced by the command buffer of one of the plurality of memory subsystems and a second delay introduced by the data buffer of one of the plurality of memory subsystems.

15. An electronic system comprising:

a microprocessor;

a memory controller coupled to the microprocessor;

a separate unidirectional command and address bus coupled to the memory controller, the memory controller communicating commands and addresses to the unidirectional command and address bus;

a separate bidirectional data bus coupled to the memory controller, the memory controller communicating data information to the separate bidirectional data bus for a write operation and receiving the data information from the bidirectional data bus during a read operation; and a plurality N of pipelined memory subsystems, wherein each memory subsystem includes:

a plurality M of memory devices wherein each memory device internally contains a data in and a data out buffer, a column decoder and a row decoder;

a command buffer, directly connected to the separate unidirectional command and address bus, and connected between the command and address bus and the plurality of memory devices, the command buffer receiving and latching the commands and addresses from the separate command and address bus and driving the commands and addresses to the plurality of memory devices, wherein the command buffer is shared by the plurality of memory devices; and a data buffer connected between the plurality of memory devices and the separate bidirectional data bus, and directly connected to the separate bidirectional data bus, the data buffer receiving and latching the data information from the separate bidirectional data bus and driving the data information to the plurality of memory devices for a write operation, the data buffer receiving and latching the data information from the plurality of memory devices and driving the data information to the separate bidirectional data bus for a read operation.

16. The electronic system of claim 15, wherein the memory controller communicates the commands and addresses and data information using a pipelined packet-protocol which incorporates a first delay introduced by the command buffer of one of the plurality of pipelined memory subsystems and a second delay introduced by the data buffer of one of the plurality of pipelined memory subsystems.

17. The electronic system of claim 15, wherein each memory device is a dynamic random access memory device.

18. The electronic system of claim 15, wherein both M and N equal eight.

19. The electronic system of claim 15, wherein the data buffer is shared by the plurality of memory devices.

20. A method of performing a memory transaction in an electronic system having a memory controller and a plurality of memory subsystems, wherein each memory subsystem includes a command buffer, a data buffer and a plurality of memory devices, wherein each memory device internally includes a data in and a data out buffer, a column decoder and a row decoder, comprising:

issuing information to the memory controller;

issuing commands and addresses on a separate unidirectional command and address bus;

issuing data on a separate bidirectional data bus;

latching the commands and addresses received from the separate unidirectional command and address bus in the command buffers of the plurality of memory subsystems, wherein each of the command buffers is shared by the plurality of memory device of each memory subsystem and is positioned directly between the command and address bus and the plurality of memory devices of each memory subsystem;

driving the latched commands and addresses to the plurality of memory devices; and if the memory transaction is a write, receiving and latching the data in the data buffers of the plurality of memory subsystems, driving the latched data to the data in and data out buffer, and writing the data to an addressed memory storage of the plurality of memory devices.

21. The method of claim 20, wherein issuing commands and addresses and issuing data include executing a packet protocol which incorporates a first delay introduced by the command buffer and a second delay introduced by the data buffer.

22. A method of storing data, in an electronic system, having a memory controller and a plurality of memory subsystems, wherein each memory subsystem includes a command buffer, a data buffer and a plurality of memory devices, wherein each memory device internally includes a data in and a data out buffer, a column decoder and a row decoder, comprising:

issuing information to the memory controller, wherein the memory controller receives the information and wherein the memory controller issues commands and addresses on a separate unidirectional command and address bus;

issuing data on a separate bidirectional data bus;

latching the commands and addresses read from the separate unidirectional command and address bus in the command buffers of the plurality of memory subsystems, wherein each of the command buffers is shared by the plurality of memory device of each memory subsystem and is positioned directly between the separate unidirectional command and address bus and the plurality of memory devices of each memory subsystem;

latching the data received from the separate bidirectional data bus in the data buffers of the plurality of memory subsystems;

driving the latched commands and addresses to the plurality of memory devices;

driving the latched data to the data in and data out buffer of the plurality of memory devices; and storing the data from the data in and data out buffer in addressable storage of the plurality of memory devices.

23. The method of claim 22, wherein issuing commands and addresses and issuing data include executing a packet protocol which incorporates a first delay introduced by the command buffer and a second delay introduced by the data buffer.

24. In an electronic system having a memory controller and a plurality of memory subsystems, wherein each memory subsystem includes a command buffer, a data buffer and a plurality of memory devices, wherein each memory device internally includes a data in and a data out buffer, a column decoder and a row decoder, a method of retrieving data comprising:

issuing information to the memory controller;

issuing commands and addresses on a separate unidirectional command and address bus;

latching the commands and addresses read from the separate unidirectional command and address bus in the command buffers of the plurality of memory subsystems, wherein each of the command buffers is shared by the plurality of memory device of each memory subsystem and is positioned directly between the separate unidirectional command the command and address bus and the plurality of memory devices of each memory subsystem;

driving the latched commands and addresses to the plurality of memory devices of the plurality of memory subsystems;

retrieving data from addressable storage of the plurality of memory devices of the plurality of memory subsystems;

latching the data in the data in and data out buffer of a memory storage device;

latching the data in the data buffers of the plurality of memory devices of the plurality of memory subsystems; and receiving the data on a separate bidirectional data bus.

25. The method of claim 24, wherein issuing commands and addresses and receiving data include executing a packet protocol which incorporates a first delay introduced by the command buffer and a second delay introduced by the data buffer.

26. A memory system comprising:

a separate unidirectional command and address bus coupleable to a memory control device;

a separate bidirectional data bus coupleable to the memory control device; and a plurality N of pipelined memory subsystems, wherein each memory subsystem includes:

a plurality M of memory devices, wherein each memory device internally contains a data in and a data out buffer, a column decoder and a row decoder;

a command buffer directly connected between the separate unidirectional command and address bus and the plurality of memory devices, the command buffer receiving and latching commands and addresses from the separate unidirectional command and address bus and driving the commands and addresses to the plurality of memory devices, wherein the command buffer is shared by the plurality of memory devices; and a data buffer connected between the plurality of memory devices and the separate bidirectional data bus, the data buffer receiving and latching data information from the separate bidirectional data bus and driving the data information to data in and data out buffer of the plurality of memory devices for a write operation, the data buffer receiving and latching the data information from the data in and data out buffer of the plurality of memory devices and driving the data information to the separate bidirectional data bus for a read operation.

27. The memory system of claim 26, wherein the commands and addresses and the data information communicate using a pipelined packet-protocol which incorporates a first delay introduced by the command buffer register of one of the plurality of pipelined memory subsystems and a second delay introduced by the data buffer of one of the plurality of pipelined memory subsystems.

28. The memory system of claim 26, wherein each memory device is a dynamic random access memory device.

29. The memory system of claim 26, wherein both M and N equal eight.

30. The memory system of claim 26, wherein the data buffer is shared by the plurality of memory devices.

31. A method of storing data in a pipeline memory system, having a plurality of memory subsystems, wherein each memory subsystem includes a command buffer, a data buffer and a plurality of memory devices, wherein each memory device internally includes addressable storage, a data in and a data out buffer, a column decoder and a row decoder, comprising:

receiving commands and addresses from a separate unidirectional command and address bus;

receiving data from a separate bidirectional data bus;

latching the commands and addresses in the plurality of command buffers, wherein each command buffer is directly connected to the separate unidirectional command and address bus;

latching the data in the plurality of data buffers;

driving the latched commands and addresses to the column and row decoders;

driving the latched data to the data in buffers; and storing the data latched in the data in buffer in the addressable storage of the plurality of memory devices.

32. The method of claim 31, wherein receiving commands and addresses and receiving data include executing a packet protocol which incorporates a first delay introduced by the command buffer and a second delay introduced by the data buffer.

33. A method of retrieving data in a pipeline memory system, having a plurality of memory subsystems, wherein each memory subsystem includes a command buffer, a data buffer and a plurality of memory devices, wherein each memory device internally includes addressable storage, a data in and a data out buffer, a column decoder and a row decoder, comprising:

receiving commands and addresses from a separate unidirectional command and address bus;

latching the commands and addresses in the plurality of command buffers directly connected to the separate unidirectional command and address bus;

driving the latched commands and addresses to the column and row decoders;

retrieving data from the addressable storage of the plurality of memory devices;

latching the data in the data in and data out buffer of the memory device;

latching the data from the data in and data out buffer in the plurality of data buffers; and driving the data from the data in and data out buffer onto a data bus.

34. The method of claim 33, wherein receiving commands and addresses and driving the data include executing a packet protocol which incorporates a first delay introduced by the command buffer and a second delay introduced by the data buffer.

35. A memory system, comprising:

a separate unidirectional command and address bus in electrical communication with a memory control device;

a separate bidirectional data bus in electrical communication with the memory control device; and a plurality N of pipelined memory subsystems, wherein each memory subsystem includes:

a plurality M of memory devices, wherein each memory device internally contains a data in and a data out buffer, a column decoder and a row decoder;

a command buffer directly connected to the separate unidirectional command and address bus, and connected between the separate unidirectional command and address bus and the plurality of memory devices, the command buffer receiving and latching commands and addresses from the separate unidirectional command and address bus and driving the commands and addresses to the plurality of memory devices, wherein the command buffer is shared by the plurality of memory devices; and a data buffer connected between the data in and data out buffer of each of the plurality of memory devices and the separate bidirectional data bus, the data buffer receiving and latching data information from the separate bidirectional data bus and driving the data information to the data in and data out buffer of the plurality of memory devices for a write operation, the data buffer receiving and latching the data information from the data in and data out buffer of the plurality of memory devices and driving the data information to the separate bidirectional data bus for a read operation, wherein the data buffer is directly connected to the separate bidirectional data bus.

36. The memory system of claim 35, wherein the commands and addresses and the data information communicate using a pipelined packet-protocol which incorporates a first delay introduced by the command buffer of one of the plurality of pipelined memory subsystems and a second delay introduced by the data buffer of one of the plurality of pipelined memory subsystems.

37. The memory system of claim 35, wherein each memory device is a dynamic memory device.

38. The memory system of claim 35, wherein both N and M equal eight.

39. The memory system of claim 35, wherein the data buffer is shared by the plurality of memory devices.

40. A method of retrieving data in a pipelined memory system, comprising:

issuing commands and addresses on a separate unidirectional command and address bus to a plurality of memory subsystems;

latching the commands and addresses in a command buffer in each of the plurality of memory subsystems;

driving the latched commands and addresses to column and row decoders in each of the plurality of subsystems;

retrieving data from addressable storage of only one of the plurality of memory subsystems;

latching the data in a data buffer of the one of the plurality of memory subsystems; and receiving the data on a separate bidirectional data bus.

41. A memory system comprising:

a memory controller;

a separate unidirectional command and address bus coupled to the memory controller, the memory controller communicating commands and addresses to the separate unidirectional command and address bus;

a separate bidirectional data bus coupled to the memory controller, the memory controller communicating data information to the separate bidirectional data bus for a write operation and receiving the data information from the separate bidirectional data bus during a read operation;

and a plurality N of pipelined memory subsystems, wherein each memory subsystem includes:

a plurality M of memory devices wherein each memory device internally consists of a data in and a data out buffer, a decoder and an array of memory cells;

a command buffer directly connected between the separate unidirectional command and address bus and the plurality of memory devices, the command buffer receiving and latching the commands and addresses from the separate unidirectional command and address bus and driving the commands and addresses to the plurality of memory devices, wherein the command buffer is shared by the plurality of memory devices; and a data buffer directly connected between the plurality of memory devices and the separate bidirectional data bus, the data buffer receiving and latching the data information from the separate bidirectional data bus and driving the data information to the plurality of memory devices for a write operation, the data buffer receiving and latching the data information from the plurality of memory devices and driving the data information to the bidirectional data bus for a read operation.

42. The memory system of claim 41, wherein the data buffer is shared by the plurality of memory devices.

43. A memory system comprising:

a memory controller;

a separate unidirectional command and address bus coupled to the memory controller, the memory controller communicating commands and addresses to the separate unidirectional command and address bus;

a separate bidirectional data bus coupled to the memory controller, the memory controller communicating data information to the separate bidirectional data bus for a write operation and receiving the data information from the separate bidirectional data bus during a read operation; and a plurality N of pipelined memory subsystems, wherein each memory subsystem includes:

a plurality M of memory devices, wherein each memory device internally contains a data in and a data out buffer, a column decoder and a row decoder;

a command buffer directly connected between the separate unidirectional command and address bus and the plurality of memory devices, the command buffer receiving and latching the commands and addresses from the separate unidirectional command and address bus and driving the commands and addresses to the plurality of memory devices; and a data buffer directly connected between the plurality of memory devices and the separate bidirectional data bus, the data buffer receiving and latching the data information from the separate bidirectional data bus and driving the data information to the plurality of memory devices for a write operation, the data buffer receiving and latching the data information from the plurality of memory devices and driving the data information to the separate bidirectional data bus for a read operation, wherein the data buffer is shared by the plurality of memory devices.

44. The memory system according to claim 43, wherein the memory controller communicates the commands and addresses and the data information using a pipelined packet-protocol which incorporates a first delay introduced by the command buffer of one of the plurality of pipelined memory subsystems and a second delay introduced by the data buffer of one of the plurality of pipelined memory subsystems.

45. The memory system according to claim 43, wherein each memory device is a dynamic random access memory device.

46. The memory system according to claim 43, wherein each of the plurality N of pipelined memory subsystems includes eight memory devices and wherein N equals eight.

47. The system according to claim 43, wherein the bidirectional data bus is a single 16 bit bus, supports 64 data buffers, and operates at 800 MHz.

* * * * *

UNITED STATES PATENT AND TRADEMARK OFFICE
CERTIFICATE OF CORRECTION

PATENT NO. : 6,963,949 B2  Page 1 of 1
DATED : November 8, 2005
INVENTOR(S) : Ryan It is certified that error appears in the above-identified patent and that said Letters Patent is hereby corrected as shown below:

Title page,
Item [75], Inventor, delete "Meridian" and insert -- Eagle --.

Column 5,
Line 2, delete "(CIA)" and insert -- (C/A) --.
Line 6, delete "CIA" and insert -- C/A --.

Column 6,
Lines 10, 17 and 21, delete "CIA" and insert -- C/A --.

Column 7,
Line 53, delete "CIA" and insert -- C/A --.

Column 8,
Line 2, delete "CIA" and insert -- C/A --.

Column 17,
Line 3, delete "tbe" insert -- the --.

Signed and Sealed this

Twenty-first Day of February, 2006

JON W. DUDAS
*Director of the United States Patent and Trademark Office*